United States Patent [19]

Wheadon

[11] 4,342,342
[45] Aug. 3, 1982

[54] GROOVED AND CRACKED BATTERY PLATE AND PROCESS FOR COIL-CURING SAME

[75] Inventor: Ellis G. Wheadon, Anderson, Ind.

[73] Assignee: General Motors Corporation, Detroit, Mich.

[21] Appl. No.: 209,377

[22] Filed: Nov. 24, 1980

[51] Int. Cl.³ .......................... B65B 3/04; H01M 6/10
[52] U.S. Cl. .................................. 141/1.1; 29/623.5; 429/94
[58] Field of Search ........................... 141/1.1, 32, 33; 429/209, 233, 94; 29/2, 623.5

[56] References Cited

U.S. PATENT DOCUMENTS 3,345,213 10/1967 Lambert et al. ........................ 136/75
4,029,856 6/1977 Cromer et al. ........................ 141/1.1

*Primary Examiner*—Houston S. Bell, Jr.
*Attorney, Agent, or Firm*—Lawrence B. Plant

[57] ABSTRACT

A process for coil-curing Pb-acid storage battery plates including the steps of: transversely scoring a length of pasted grid stock to provide a plurality of closely spaced grooves; coiling the pasted stock on to reels; curing and drying the coiled stock; uncoiling the dried stock; and cutting the dried stock into individual battery plates. The grooves control the formation of any cracks formed in the dried paste during uncoiling. A scoring belt permits scoring the stock by molding the grooves therein at the time of pasting.

4 Claims, 8 Drawing Figures

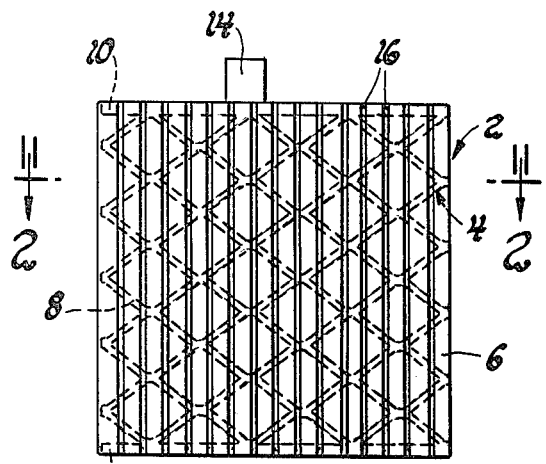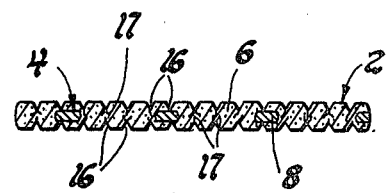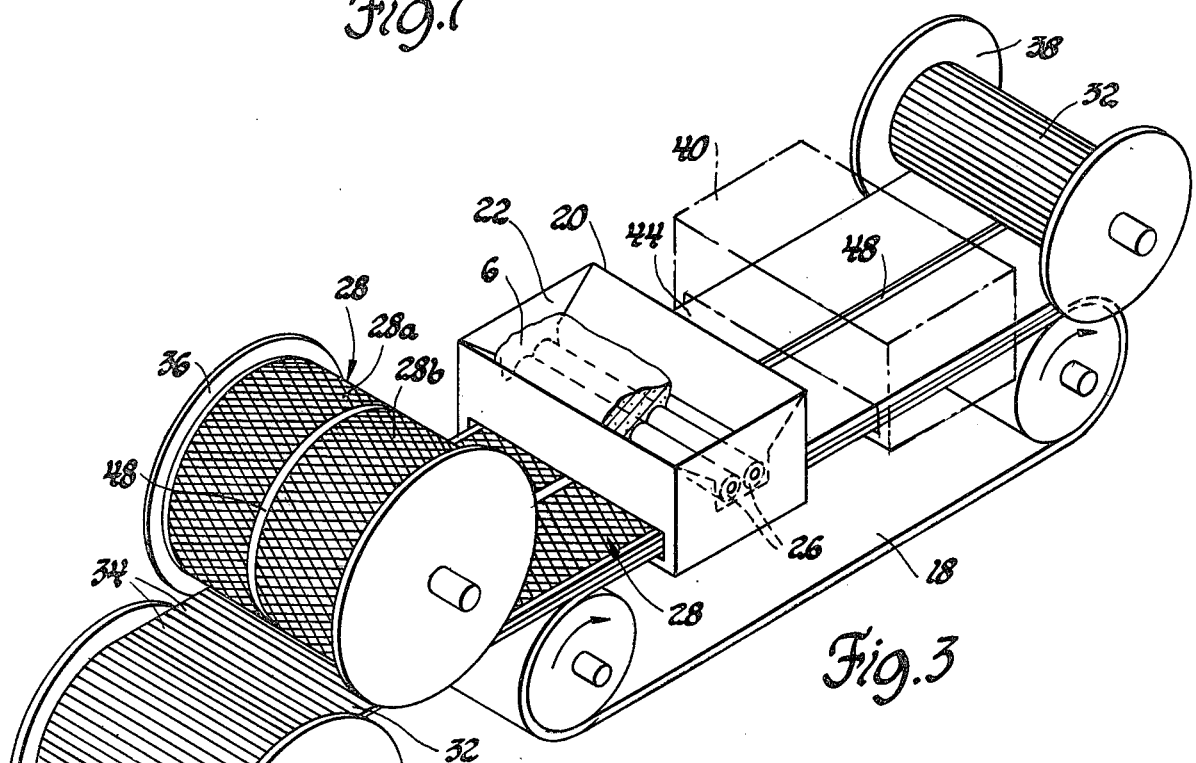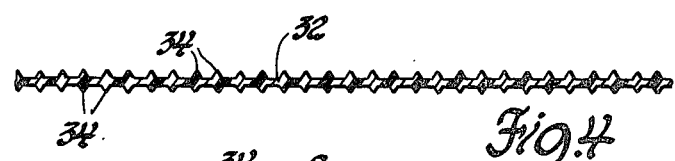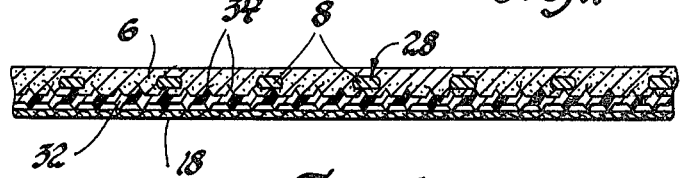

GROOVED AND CRACKED BATTERY PLATE AND PROCESS FOR COIL-CURING SAME

BACKGROUND OF THE INVENTION

This invention relates to lead-acid storage battery plates and to curing reels of the stock used to make such plates.

Pb-acid storage battery plates comprise an active material embedding a conductive framework (i.e. the grid). The grid includes a current collecting border, and a network of lead alloy grid wires extending from the border and defining a plurality of cells for retaining the active material. In the continuous strip method of making battery plates, a continuous strip of the grid material is fed through a pasting apparatus where a leady (i.e. principally PbO) active material paste is applied to the grid. In addition to the PbO, the paste typically contains about 14% by weight water and about 20% or more by weight metallic lead particles. This pasting process may be performed in a number of different ways depending on the particular type of equipment used by the manufacturer. Following pasting, the strip is cut into individual plates which are flash-dried to about 9%–12% water in order to prevent the plates from later sticking to each other. The plates leave the drying oven singly, or in pairs, and are transferred to a shingling conveyor where the plates are stacked together in overlapping, shingle-like, fashion. From the shingling conveyor the plates are scooped up in groups by an operator and hand-stacked onto a pallet. The pallet is then moved by fork-lift to a curing area. The curing process involves storage of the plates for a period of time under controlled temperature and humidities and may, in some circumstances, involve steaming of the plates. During curing, the metallic lead particles are oxidized to lead oxide (an exothermic reaction) which heats up the plates and promotes further drying. At the end of cure, the residual metallic lead and moisture content of the plates is about 2% each. Following curing, the plates are hand-loaded off the curing pallets and into appropriate battery assembly apparatus. In the dried condition the plates are very suscepticle to damage due to rough handling. Even the mere flexing of the plate can cause random cracking of the paste, primarily at the interface between the paste and the grid wires. This cracking causes resistance to electron transfer through the active material and between the active material and the grid surface. In severe situations, the cracking can cause loss of the active material from the grid.

The speed of the above described process is limited by the rate at which the plates can be manually stacked, and later unstacked. It would be desirable to provide a process which is faster, less expensive and less manual labor dependant. It would be even more desirable if a faster, more economical process could be developed which also produces a better plate.

Accordingly it is an object of the present invention to provide a faster, less labor dependant process for curing Pb-acid storage battery plates and thereafter preparing them for assembly into batteries. Another object of the present invention is to provide a Pb-acid storage battery plate offering increased electrolyte availability and exposure to the plate's active material. These and other objects and adantages of the present invention will become more readily apparent from the detailed description thereof which follows.

BRIEF DESCRIPTION OF THE INVENTION

The present invention comprehends a process for coil-curing Pb-acid storage battery plates, wherein strips of pasted grid stock are coiled upon reels, cured and thereafter uncoiled and cut into individual battery plates. The strip of pasted grid stock is scored transverse its length so as to provide a plurality of closely spaced (i.e. about 12–16 mm apart) grooves across the faces of the strip. The depth of the groove can vary from plate to plate but will preferably correspond to amount the grid is overpasted. Hence for grids overpasted by about 0.5 mm, the groove will be about 0.5 mm deep. The primary function of the grooves is to control the pattern of cracks which will develop when the cured and dried strip is eventually uncoiled. The grooves tend to concentrate the cracks there beneath and generally orient the cracks parallel to the grooves. The grooves will parallel the lateral edges of the plates and extend perpendicular to the grid's primary current collecting border which carries the lug used to connect the plate to other plates in a battery cell element. Thusly oriented grooves/cracks do not create such discontinuities in the active material as to significantly impede the flow of current through the active mateiral to the lug-bearing border. In addition to controlling crack formation, grooves so formed provide increased electrolyte capacity, and increased plate area and exposure to the electrolyte for corresondingly enhanced performance. Preferably the plates will be so oriented in the finished battery that the grooves will be vertical therein and thereby enhance electrolyte mobility within the battery.

Scoring of the plate may be effected in a number of ways e.g. by molding, raking, roll-forming, etc. Scoring is preferably effected, at least in part, by molding-in the grooves concurrent with pasting by belt-pasting the grid strip and employing a discrete ribbed scoring belt underlying the strip as it passes beneath the paste applicator. The scoring belt remains with the strip during coiling and curing and is then removed for reuse as the strip is uncoiled from the reel. More specifically, a scoring belt having approximately the same length and width as the grid strip is laid atop the pasting belt before passing beneath the paste applicator. The belt has a plurality of closely spaced ribs formed thereon transverse the length of the belt and on both sides thereof. The grid strip is then laid atop the scoring belt and the two (i.e. belt and strip) are passed beneath the paste applicator which forces the paste down through the grid stip onto the scoring belt. Ribs on the top side of the scoring belt form corresponding grooves on the underside of the pasted grid. Thereafter the pasted strip and scoring belt are wound up tightly on reel under sufficient tension that the ribs on the underside of the scoring belt embed themselves in the soft paste on the top side of the strip. Following curing, the reel is removed to the beginning of the assembly line and uncoiled. The pasted strip is cut into individual plates while the scoring belt is taken up on a separate reel, cleaned and reused at the pasting station.

FIG. 1 is an elevational view of a battery plate made in accordance with the present invention;

FIG. 2 is a sectional view taken in the direction 2—2 of FIG. 1;

FIG. 3 is a perspective view illustrating apparatus for effecting the pre-cure phase of a process in accordance with the present invention;

FIG. 4 is a longitudinal sectional view of a scoring belt used in conjunction with the process illustrated in FIG. 3;

FIG. 5 is an enlarged, side, sectional view of pasted grid stock prior to coiling;

DETAILED DESCRIPTION OF THE PREFERRED EMBODIMENT OF THE INVENTION

Figure 6:
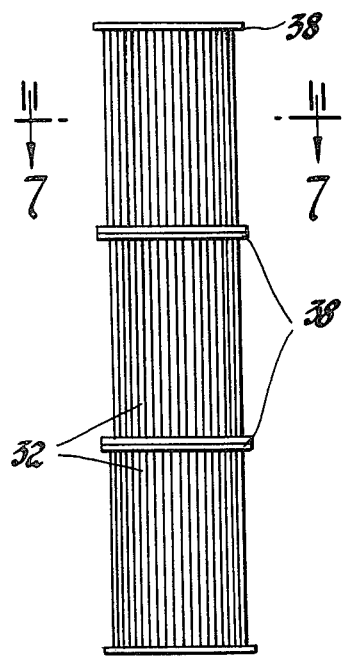
FIG. 6 is an elevational view of a stack of coiled reels coiled for curing.

FIGS. 1 and 2 depict a battery plate 2 comprising a grid 4 embedded in a leady active material 6. The grid 4 includes a network of intersecting grid wires 8 defined by an upper current collecting border 10 and lower supporting border 12. The upper current collecting border 10 includes a lug 14 for electrically connecting the plate 2 to like plates in a battery cell element as by means of a plate strap or the like. A plurality of grooves 16 formed in the faces of the plate 2 run perpendicular to the current collecting border 10 as discussed above. As best illustrated in FIG. 2, cracks 17 are formed and propogate primarily at the sides of and in line with the grooves 16 upon uncoiling and straightening of the pasted strip following curing.

FIG. 3 depicts the preferred process for coil-curing pasted battery plate-making stock prior to its being cut into individual battery plates. The Figure depicts a conventional belt-pasting apparatus including a continuous pasting belt 18 for conveying grid strip 28 beneath a paste applicator 20. The paste applicator 20 is typically a hopper 22 containing the active material paste 6 and two counter-rotating rollers 26 for pressing the active material paste 6 into the grid strip 28 as it passes beneath the applicator 20. A dispensing reel 30 has a length of rubber scoring belt 32 (see FIG. 4) coiled thereon for feeding onto the pasting belt 18. The scoring belt 32 is substantially coextensive with the length and width of the strip 28 and includes a plurality of ribs 34 transverse the length thereof and on the top and bottom faces thereof as best shown in FIG. 4. The scoring belt 32 is first laid upon the pasting belt 18. The strip of grid stock 28 is then fed from the grid stock reel 36 so as to lay on top of the belt 32. As shown, the grid stock 28 is of the two expansion-type such as for example is disclosed in Daniels U.S. Pat. No. 3,890,160 assigned to the assignee of the present invention and has two grid strips 28a and 28b joined at the center by metal strip 48. The stock 28 and belt 32 are then conveyed together beneath the paste applicator 20 where the paste 6 is forced through the openings between the grid wires 8 in the grid stock 28 and pressed firmly against the scoring belt 32 as best shown in FIG. 5.

Figure 7:
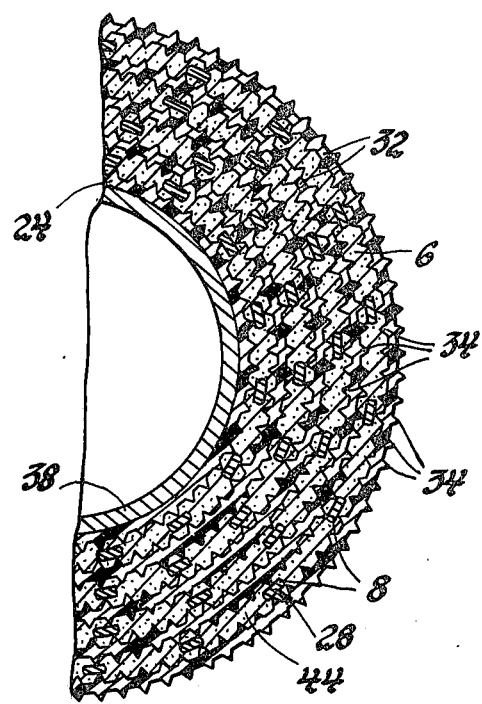
FIG. 7 is an enlarged, sectional view of portion of the curing reels in the direction 7—7 of FIG. 6.

The pasted grid-stock 44 and scoring belt 32 may be wound up directly onto the curing reel 38 or may first be flash dried in an optional oven 40 (shown in phantom) to lower the water content of the paste before coiling on reel 38. The respective reels 30, 36 and 38 are appropriately biased so as to maintain the belt 32 and grid stock 28 under sufficient tension to cause the ribs 34 on the underside of the belt 32 to embed themselves in the paste 6 on the top side of the grid stock 28 as the two are coiled together onto reel 38 (see FIG. 7). The surface of the reel 38 has a layer of ribbed scoring material 24 thereon to score the top of the pasted stock 44 which first engages the reel and would not otherwise be scored by the belt 34.

When full, the curing reels 38 are removed and stacked in the curing area as best shown in FIG. 6. The curing itself will vary according to the nature of the paste (e.g. positive or negative) as well as the preferences of the particular manufacturer. In this regard the precise parameters (i.e. time, temperature, humidity, etc.) of the curing operation are not considered part of the present invention.

Figure 8:
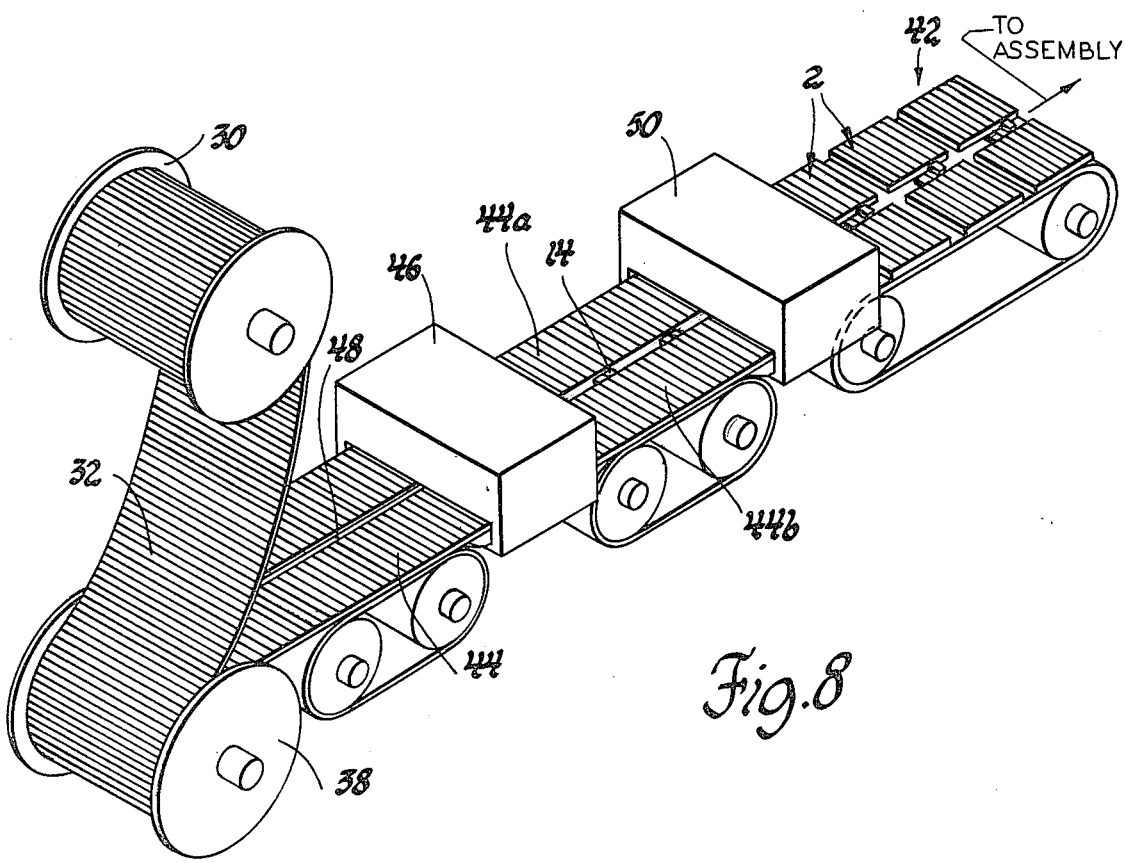
FIG. 8 is a perspective view illustrating apparatus for effecting the post-cure phases of a process in accordance with the present invention.

Following curing the curing reels 38 are removed to the beginning of the battery assembly line 42, as best shown in FIG. 8. Here the pasted grid stock 44 is uncoiled from the curing reel 38 and fed into a lug blanking station 46 where the plate lugs 14 are formed in a punching operation performed on the metal center strip 48 of the pasted strip 44. At the same time, the scoring belt 32 is removed and taken up on scoring belt reel 30 for ultimate cleaning and reuse. In addition to forming the lugs, the lug blanking station 48 separates the pasted strip 44 into two longitudinal strips 44a and 44b which, in turn are segmented into individual battery plates 2 in a plate cutting station 50. Following such segmentation the discrete battery plates 2 are conveyed into appropriate battery assembly apparatus (not shown) where they are integrated with plates of opposite polarity to form a battery cell element and eventually assembled into a complete battery.

While this invention has been disclosed primarily in terms of specific embodiments thereof it is not intended that it be limited thereto but rather only to the extent set forth hereafter in the claims which follow.

The embodiments of the invention in which an exclusive property or privilege is claimed are defined as follows:

1. A process for making Pb-acid storage battery plates comprising the steps of:
   passing a strip of grid stock lengthwise through a battery grid pasting station, said stock comprising a network of interconnected grid-wires defining a plurality of paste-receiving cells;
   applying a wet, leady active material paste to said stock at said station such as to fill said cells and to provide a substantially flat pasty surface on each side of said stock;
   scoring each of said surfaces transverse the length of said strip such as to provide a plurality of substantially paralleling grooves closely spaced along said length;
   coiling the grooves stock on to reels;
   curing and drying the coiled stock;
   uncoiling the dried stock; and
   cutting the uncoiled stock into individual battery plates;
   said grooves serving to control the formation and location of cracks formed in said paste during uncoiling so as not to substantially loosen said paste from said network or substantially increase the internal electrical resistance of the plate.

2. A process for making Pb-acid storage battery plates comprising the steps of:
   passing a strip of grid stock lengthwise through a battery grid pasting station, said stock comprising a network of interconnected grid-wires defining a plurality of paste-receiving cells;

applying a wet leady active material paste to said stock at said station such as to fill said cells and to provide a substantially flat pasty surface on each side of said stock;

concurrently scoring said surfaces transverse the length of said strip such as to provide a plurality of grooves closely spaced along said length;

coiling the grooved stock on to reels; curing and drying the coiled stock;

uncoiling said dried stock; and cutting the uncoiled stock into individual battery plates;

said grooves serving to control the formation and location of cracks formed in said paste during uncoiling so as not to substantially loosen said paste from said network or substantially increase the internal electrical resistance of the plate.

3. A process for making Pb-acid storage battery plates comprising the steps of:

positioning a scoring belt in contiguous face-to-face relation to a strip of grid stock comprising a network of interconnected grid-wires defining a plurality of active material paste-receiving cells, said belt being substantially coextensive length-wise and width-wise with said strip and having a scoring face thereon including a plurality of closely spaced ribs transverse its length;

passing said belt and strip together lengthwise through a battery grid pasting station;

pressing a wet leady active material paste through said strip and against said belt to fill said cells and mold said paste against scoring face such as to provide a plurality of grooves in said paste corresponding to said ribs;

coiling the pasted strip and belt on to reels;

curing and drying the coiled pasted strip;

uncoiling the dried pasted strip and belt;

removing the belt from the dried pasted strip; and cutting the dried pasted strip into individual battery plates;

said grooves serving to control the formation and location of cracks formed in said paste during uncoiling so as not to substantially loosen said paste from said network or substantially increase the internal electrical resistance of the plate.

4. A process for making Pb-acid storage battery plates comprising the steps of:

positioning a scoring belt in contiguous face-to-face relation to a strip of grid stock comprising a network of interconnected grid-wires defining a plurality of active material paste-receiving cells, said belt being substantially coextensive length-wise and width-wise with said strip and having a scoring face thereon including a plurality of closely spaced ribs transverse its length;

passing said belt and strip together lengthwise through a battery grid pasting station;

pressing a wet leady active material paste through said strip and against said belt to fill said cells and mold said paste against scoring face such as to provide a plurality of grooves in said paste corresponding to said ribs;

coiling the pasted strip and belt on to reels;

curing and drying the coiled pasted strip;

uncoiling the dried pasted strip and belt;

removing the belt from the uncoiling dried pasted strip; and cutting the dried pasted strip into individual battery plates;

said grooves serving to control the formation and location of cracks formed in said paste during uncoiling so as not to substantially loosen said paste from said network or substantially increase the internal electrical resistance of the plate.

* * * * *